(12) United States Patent
    Xie et al.

(10) Patent No.: US 11,064,502 B2
(45) Date of Patent: Jul. 13, 2021

(54) METHOD FOR SENDING INFORMATION, METHOD FOR RECEIVING INFORMATION, NETWORK DEVICE, AND TERMINAL DEVICE

(71) Applicant: HUAWEI TECHNOLOGIES CO., LTD., Guangdong (CN)

(72) Inventors: Xinqian Xie, Beijing (CN); Zhiheng Guo, Beijing (CN); Wei Sun, Shenzhen (CN); Yongqiang Fei, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 87 days.

(21) Appl. No.: 16/667,858

(22) Filed: Oct. 29, 2019

(65) Prior Publication Data
    US 2020/0068577 A1     Feb. 27, 2020

Related U.S. Application Data

(63) Continuation of application No. PCT/CN2018/084314, filed on Apr. 25, 2018.

(30) Foreign Application Priority Data

May 5, 2017   (CN) .......................... 201710312823.1

(51) Int. Cl.
    *H04W 72/08*     (2009.01)
    *H04L 5/00*      (2006.01)
    *H04W 72/04*     (2009.01)

(52) U.S. Cl.
    CPC ......... *H04W 72/082* (2013.01); *H04L 5/0073* (2013.01); *H04W 72/042* (2013.01); *H04W 72/048* (2013.01); *H04W 72/0446* (2013.01)

(58) Field of Classification Search
    CPC ............. H04W 72/082; H04W 72/042; H04W 72/0446; H04W 72/048; H04L 5/0073
    See application file for complete search history.

(56) References Cited

U.S. PATENT DOCUMENTS

2010/0296410 A1   11/2010   Kazmi et al.
2013/0070634 A1    3/2013   Gao et al.
(Continued)

FOREIGN PATENT DOCUMENTS

CN       101127998 A     2/2008
CN       101971662 A     2/2011
(Continued)

OTHER PUBLICATIONS

Huawei et al: "On CLI measurement and power control for cross-link interference mitigation",3GPP Draft; R1-1704255, Apr. 2, 2017, total 7 pages.
(Continued)

*Primary Examiner* — Dinh Nguyen
(74) *Attorney, Agent, or Firm* — Womble Bond Dickinson (US) LLP

(57) ABSTRACT

Embodiments of this disclosure provide a method for sending information, a method for receiving information, a network device, and a terminal device. The method includes: determining, by a first network device, first indication information, where the first indication information is used to indicate a first time segment and N second time segments, the first time segment is used by a first terminal device to send a first measurement signal to at least one second terminal device in coverage of N second network devices, and a $k^{th}$ second time segment of the N second time segments is used by the first terminal device to receive a second measurement signal from a second terminal device in the coverage of a $k^{th}$ second network device of the N second network devices, where N is a positive integer, and k=1,
(Continued)

2, . . . , and N; and sending, by the first network device, the first indication information to the first terminal device. According to the method in the embodiments of this disclosure, the first terminal device can learn of a resource for sending a measurement signal and a resource for receiving a measurement signal, to successfully send and receive the measurement signals.

17 Claims, 3 Drawing Sheets

(56) References Cited

U.S. PATENT DOCUMENTS

| | | | |
|---|---|---|---|
| 2014/0313925 | A1 | 10/2014 | Seo et al. |
| 2015/0029884 | A1 | 1/2015 | Seo et al. |
| 2019/0207688 | A1 | 7/2019 | Sun et al. |

FOREIGN PATENT DOCUMENTS

| | | | |
|---|---|---|---|
| CN | 102404055 | A | 4/2012 |
| CN | 103517312 | A | 1/2014 |
| CN | 103999379 | A | 8/2014 |
| CN | 104247495 | A | 12/2014 |
| CN | 104602267 | A | 5/2015 |
| CN | 105100177 | A | 11/2015 |
| CN | 106507372 | A | 3/2017 |
| CN | 107889140 | A | 4/2018 |
| EP | 2996437 | A1 | 3/2016 |

OTHER PUBLICATIONS

ZTE et al: "Discussion on duplexing flexibility and cross-link interference mitigation schemes",3GPP Draft; R1-1701616, Feb. 12, 2017,total 8 pages.

ZTE et al: "Discussion on Measurements and RS Design for CLI Mitigation",3GPP Draft; R1-1701615, Feb. 6, 2017, total 13 pages.

METHOD FOR SENDING INFORMATION, METHOD FOR RECEIVING INFORMATION, NETWORK DEVICE, AND TERMINAL DEVICE

CROSS-REFERENCE TO RELATED APPLICATIONS

This application is a continuation of International Application No. PCT/CN2018/084314, filed on Apr. 25, 2018, which claims priority to Chinese Patent Application No. 201710312823.1, filed on May 5, 2017. The disclosures of the aforementioned applications are hereby incorporated by reference in their entireties.

TECHNICAL FIELD

Embodiments of the present disclosure relate to the communications field, and more specifically, to a method for sending information, a method for receiving information, a network device, and a terminal device.

BACKGROUND

In a long term evolution (Long Term Evolution, LTE)/long term evolution advanced (Long Term Evolution Advanced, LTE-A) communications system, based on different duplex modes, a frequency division duplex (Frequency Division Duplex, FDD) mode and a time division duplex (Time Division Duplex, TDD) mode may be included.

In a wireless communications system, communication may be classified into different types based on different types of sending nodes and receiving nodes. Generally, sending information by a network device to a terminal device is referred to as downlink communication, and sending information by the terminal device to the network device is referred to as uplink communication.

For example, for a wireless communications system operating in the TDD mode, the system usually includes one operating frequency band. Therefore, the frequency band is also referred to as an unpaired frequency band. For the system using the unpaired frequency band, within a period of time and in an area covered by a same network device, the entire operating frequency band is used primarily for downlink communication, or is used primarily for uplink communication. More specifically, for an area covered by network devices that use a same operating frequency band and are geographically close to each other, all cells in the area should simultaneously perform downlink communication or uplink communication. However, terminal devices in the system are unevenly distributed, communications service volumes greatly differ, and downlink service volumes and uplink service volumes of the cells in the area covered by the same frequency band quite differ at a same moment. Therefore, different service volume requirements of the cells cannot be satisfied when all the cells use a same uplink/downlink communication configuration.

For another example, for a wireless communications system operating in the FDD mode, the system usually includes two paired frequency bands for communication, where one frequency band is used for downlink communication from a network device to a terminal device, and the other frequency band is used for uplink communication from the terminal device to the network device. Similarly, because downlink service volumes and uplink traffic volumes of cells covered by a same pair of paired frequency bands greatly differ at a same moment, and in the paired frequency bands, bandwidth of a downlink frequency band is often the same as that of an uplink frequency band. Therefore, different service volume requirements of the cells cannot be satisfied.

To resolve the foregoing problems, in the prior art, network transmission resource utilization is improved by using a flexible duplex technology.

For example, for a wireless communications system operating in the FDD mode, a network device performs downlink communication by using an uplink frequency band, and can separately configure an uplink frequency band for each cell. However, when the uplink frequency band of a serving cell is used for downlink communication, and the uplink frequency band of at least one neighboring cell is still used for uplink communication, a terminal device in coverage of the serving cell suffers interference in the uplink frequency band from an uplink signal sent by the neighboring cell, resulting in excessively poor communication quality.

For another example, for a wireless communications system operating in the TDD mode, a ratio of an uplink communication time segment to a downlink communication time segment of a current cell in a relatively long period of time may be determined based on a ratio of an uplink service to a downlink service of the cell, or a communication type within each time segment may be dynamically adjusted. Similarly, when a serving cell performs uplink communication and one or more neighboring cells perform downlink communication at the same time, an uplink signal sent by a terminal device in the serving cell interferes with a downlink signal received by a terminal device in the neighboring cell, that is, cross link interference occurs between the terminal devices.

In the prior art, to avoid cross link interference between terminal devices, two or more neighboring network devices may use a coordinated scheduling method. For example, when a first network device schedules a first terminal device to perform downlink transmission, a neighboring second network device does not schedule a second terminal device that may cause interference to the first terminal device, or allocates a resource orthogonal to a resource of the first terminal device for the second terminal device, thereby avoiding cross link interference.

However, to enable a network device to perform coordinated scheduling, each network device should learn, in advance, of an interference relationship between a terminal device in coverage of the network device and a terminal device in a neighboring cell. However, the network device cannot directly obtain the interference relationship between the terminal devices. Therefore, the network device should enable the terminal device in the coverage of the network device to measure interference between the terminal devices, and then report the interference to the network device. Therefore, the network device should allocate a corresponding resource to the terminal device, so that the terminal device sends a measurement signal to a terminal device in another cell, and receives a measurement signal from the terminal device in the another cell. Therefore, an urgent problem to be resolved in the art is how to enable a terminal device in coverage of a network device to learn of a resource for sending a measurement signal and a resource for receiving a measurement signal, to successfully send and receive the measurement signals.

SUMMARY

Embodiments of this disclosure provide a method for sending information, a method for receiving information, a network device, and a terminal device, so that a terminal device in coverage of a network device can learn of a resource for sending a measurement signal and a resource for receiving a measurement signal, to successfully send and receive the measurement signals.

According to a first aspect, a method for transmitting data is provided. The method includes:

determining, by a first network device, first indication information, where the first indication information is used to indicate a first time segment and N second time segments, the first time segment is used by a first terminal device to send a first measurement signal to at least one second terminal device in coverage of N second network devices, and a $k^{th}$ second time segment of the N second time segments is used by the first terminal device to receive a second measurement signal from a second terminal device in the coverage of a $k^{th}$ second network device of the N second network devices, where N is a positive integer, and k=1, 2, . . . , and N; and sending, by the first network device, the first indication information to the first terminal device.

In this embodiment of this disclosure, the first network device sends the first indication information to the first network device, where the first indication information is used to indicate the first time segment and the N second time segments, so that the first terminal device in coverage of the first network device can obtain information about a time resource for sending the first measurement signal to the second terminal device in the coverage of the N second network devices, and information about a time resource for receiving the second measurement signal from the second terminal device in the coverage of each second network device.

In one embodiment, before the determining, by a first network device, first indication information, the method further includes:

determining, by the first network device, second indication information, where the second indication information is used to indicate that the first terminal device receives the first indication information; and sending, by the first network device, the second indication information to the first terminal device.

Specifically, if the first indication information is carried in downlink control information, the first network device should indicate a time resource for receiving the first indication information by the first terminal device.

According to a second aspect, a method for receiving information is provided. The method includes:

receiving, by a first terminal device, first indication information from a first network device, where the first indication information is used to indicate a first time segment and N second time segments, the first time segment is used by the first terminal device to send a first measurement signal to at least one second terminal device in coverage of N second network devices, and a $k^{th}$ second time segment of the N second time segments is used by the first terminal device to receive a second measurement signal from a second terminal device in the coverage of a $k^{th}$ second network device of the N second network devices, where N is a positive integer, and k=1, 2, . . . , and N;

sending, by the first terminal device according to the first indication information, the first measurement signal to the second terminal device in the coverage of the N second network devices in the first time segment; and receiving, by the first terminal device according to the first indication information, the second measurement signal from the second terminal device in the coverage of each of the N second network devices in the $N^{th}$ second time segment.

In one embodiment, before the first network device determines the first indication information, the method further includes:

receiving, by the first terminal device, second indication information sent by the first network device, where the second indication information is used to indicate that the first terminal device receives the first indication information.

In one embodiment, before the first terminal device receives the first indication information sent by the first network device, the method further includes:

receiving, by the first terminal device, second indication information sent by the first network device, where the second indication information is used to indicate that the first terminal device receives the first indication information.

Specifically, if the first indication information is carried in downlink control information, the first terminal device should perform blind detection on the first indication information on a time resource indicated by the second indication information.

In one embodiment, the first terminal device determines a measurement result based on the second measurement signal, where the measurement result includes an interference relationship between the first terminal device and the second terminal device in the coverage of each of the N second network devices; and the first terminal device sends the measurement result to the first network device.

In this embodiment of this disclosure, the first network device is enabled to obtain the interference relationship between the first terminal device and the second terminal device in each of N different cells.

In one embodiment, the second indication information is carried in radio resource control RRC layer signaling or media access control MAC layer signaling.

In one embodiment, the first time segment and some or all of the N second time segments belong to a first time unit, where the first time unit is any one of the following:

a slot, a subframe, a mini-slot, a plurality of consecutive slots, and a plurality of consecutive subframes.

In the embodiments of this disclosure, time of the first time unit is relatively short, so that the first terminal device can quickly complete measurement between the terminal devices, and report the measurement result to the first network device in a timely manner. This helps the first network device use coordinated scheduling in a timely manner to avoid cross link interference, and also can avoid a measurement result delay caused by relatively long measurement time, thereby improving measurement accuracy.

In one embodiment, the first time segment includes at least one symbol or at least one mini-slot, and the $k^{th}$ second time segment includes at least one symbol or at least one mini-slot.

In one embodiment, the first indication information is cell-common information, and/or the first indication information is carried in downlink control information.

In the embodiments of this disclosure, control information overheads can be saved by using cell-common downlink control information.

According to a third aspect, a network device is provided. The network device includes:

a processing unit, configured to determine first indication information, where the first indication information is used to indicate a first time segment and N second time segments, the first time segment is used by a first terminal device to send a first measurement signal to at least one second terminal device in coverage of N second network devices, and a $k^{th}$ second time segment of the N second time segments is used by the first terminal device to receive a second measurement signal from a second terminal device in the coverage of a $k^{th}$ second network device of the N second network devices, where N is a positive integer, and k=1, 2, . . . , and N; and a transceiver unit, configured to send the first indication information to the first terminal device.

According to a fourth aspect, a network device is provided. The network device includes:

a processor, configured to determine first indication information, where the first indication information is used to indicate a first time segment and N second time segments, the first time segment is used by a first terminal device to send a first measurement signal to at least one second terminal device in coverage of N second network devices, and a $k^{th}$ second time segment of the N second time segments is used by the first terminal device to receive a second measurement signal from a second terminal device in the coverage of a $k^{th}$ second network device of the N second network devices, where N is a positive integer, and k=1, 2, . . . , and N; and a transceiver, configured to send the first indication information to the first terminal device.

According to a fifth aspect, a terminal device is provided. The terminal device includes a transceiver unit and a processing unit, where the transceiver unit is configured to:

receive first indication information from a first network device, where the first indication information is used to indicate a first time segment and N second time segments, the first time segment is used to send a first measurement signal to at least one second terminal device in coverage of N second network devices, and a $k^{th}$ second time segment of the N second time segments is used to receive a second measurement signal from a second terminal device in the coverage of a $k^{th}$ second network device of the N second network devices, where N is a positive integer, and k=1, 2, . . . , and N;

the processing unit is configured to send, according to the first indication information, the first measurement signal to the second terminal device in the coverage of the N second network devices by using the transceiver unit in the first time segment; and the processing unit is further configured to receive, according to the first indication information, the second measurement signal from the second terminal device in the coverage of each of the N second network devices by using the transceiver unit in the $N^{th}$ second time segment.

According to a sixth aspect, a terminal device is provided. The terminal device includes a transceiver and a processor, where the transceiver is configured to:

receive first indication information from a first network device, where the first indication information is used to indicate a first time segment and N second time segments, the first time segment is used to send a first measurement signal to at least one second terminal device in coverage of N second network devices, and a $k^{th}$ second time segment of the N second time segments is used to receive a second measurement signal from a second terminal device in the coverage of a $k^{th}$ second network device of the N second network devices, where N is a positive integer, and k=1, 2, . . . , and N;

the processor is configured to send, according to the first indication information, the first measurement signal to the second terminal device in the coverage of the N second network devices by using the transceiver unit in the first time segment; and the processor is further configured to receive, according to the first indication information, the second measurement signal from the second terminal device in the coverage of each of the N second network devices by using the transceiver unit in the $N^{th}$ second time segment.

According to a seventh aspect, a computer-readable storage medium is provided. The computer-readable storage medium stores a program. The program enables a network device to perform the method according to the embodiments described herein.

According to an eighth aspect, a computer-readable storage medium is provided. The computer-readable storage medium stores a program. The program enables a terminal device to perform the method according to the embodiments described herein.

According to a ninth aspect, a computer program product including an instruction is provided. When the computer program product is run on a computer, the computer is enabled to perform the methods according to the foregoing aspects.

DESCRIPTION OF EMBODIMENTS

A network structure in embodiments of this disclosure is described below.

Figure 1:
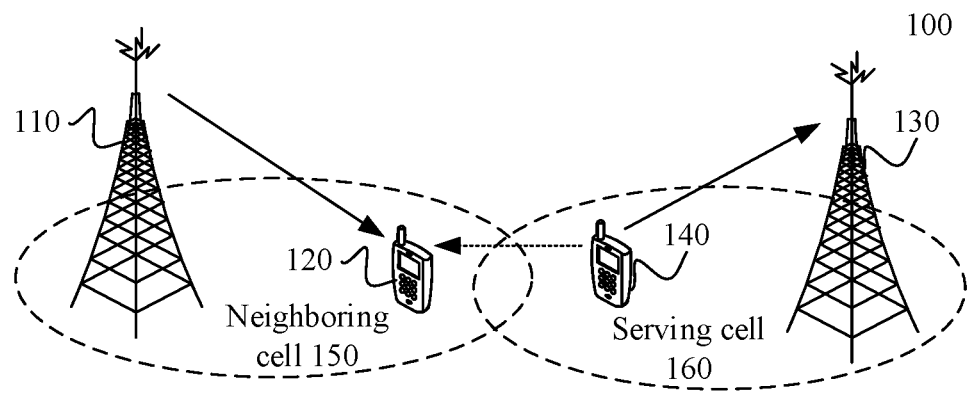
FIG. 1 is an example diagram of a network structure according to an embodiment of the present disclosure.

FIG. 1 is an example diagram of a network structure 100 according to an embodiment of the present disclosure.

As shown in FIG. 1, the network structure 100 includes a first network device 110, a first terminal device 120 in coverage of the first network device 110, a second network device 130, and a second terminal device 140 in coverage of the second network device 130. For the second terminal device 140, the coverage of the second network device 130 is a serving cell 160 of the second terminal device 140, and the coverage of the first network device 110 is a neighboring cell 150 of the terminal device 140. The serving cell 160 and the serving cell 150 overlap.

When the second terminal device 140 performs uplink communication in the serving cell 160, and the first terminal device 110 performs downlink communication in the neighboring cell 150 at the same time, an uplink signal sent by the second terminal device 140 in the serving cell 160 interferes with a downlink signal received by the first terminal device 120 in the neighboring cell 150. That is, cross link interference occurs between the terminal devices (between the first terminal device 120 and the second terminal device 140).

In other words, the serving cell 160 has the neighboring cell 150 causing cross link interference.

Especially for an indoor hotspot scenario or a dense coverage scenario of small cells, a cell has a relatively small radius, and a distance between terminal devices in coverage of different cells is relatively small, so that cross link interference severely affects performance of receiving a downlink signal by a terminal device in a neighboring cell.

To avoid cross link interference between terminal devices, two or more neighboring network devices may use a coordinated scheduling method. For example, as shown in FIG. 1, when the network device 110 schedules the terminal device 120 to perform downlink transmission, the neighboring network device 130 does not schedule the terminal device 140 that causes interference to the terminal device 120, or allocates, to the terminal device 140, a time-frequency resource that is orthogonal to a time-frequency resource of the terminal device 120, thereby avoiding cross link interference.

Therefore, to enable the network device 110 and the network device 130 to perform coordinated scheduling, each network device should learn, in advance, of an interference relationship between a terminal device in coverage of the network device and a terminal device in the neighboring cell, that is, which terminal device in the neighboring cell is interfered by the terminal device in the coverage of the network device.

It should be noted that FIG. 1 is an example diagram of the network structure in this embodiment of this disclosure. This embodiment of this disclosure is not limited thereto.

Figure 2:
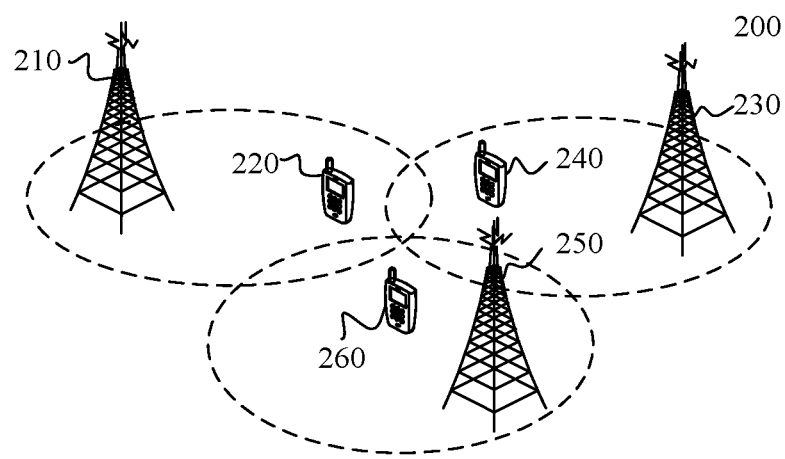
FIG. 2 is another example diagram of a network structure according to an embodiment of the present disclosure.

For example, as shown in FIG. 2, a serving cell has two neighboring cells that may cause cross link interference. Specifically, the network structure 200 includes a first network device 210, a first terminal device 220 in coverage of the first network device 210, a second network device 230, a second terminal device 240 in coverage of the second network device 230, a third network device 250, and a third terminal device 260 in coverage of the third network device 250. The coverage of the first network device 210, the coverage of the second network device 230, and the coverage of the third network device 250 overlap.

For another example, a serving cell has three neighboring cells that may cause cross link interference.

That is, the embodiments of this disclosure are applicable to various communication systems having cross link interference, especially to a communications system using a flexible duplex technology, for example, a global system for mobile communications (Global System of Mobile communication, GSM) system, a code division multiple access (Code Division Multiple Access, CDMA) system, a wideband code division multiple access (Wideband Code Division Multiple Access, WCDMA) system, a general packet radio service (General Packet Radio Service, GPRS), a long-term evolution (Long Term Evolution, LTE) system, an LTE time division duplex (Time Division Duplex, TDD), a universal mobile telecommunications system (Universal Mobile Telecommunication System, UMTS), and an enhanced machine type communication (enhanced Machine Type Communication, eMTC) communications system. As an example rather than a limitation, in the embodiments of this disclosure, an LTE-based system (including an LTE system that includes licensed-assisted access, namely, an LAA-LTE system, and also including an LTE system that includes an unlicensed spectrum) is described.

It should further be understood that, in the embodiments of the present disclosure, a network device may be a base transceiver station (Base Transceiver Station, BTS) in GSM or CDMA, or may be a NodeB (NodeB) in WCDMA, or may be an evolved NodeB (Evolutional NodeB, eNB or eNodeB) in LTE, or may be a base station device in a further 5G network or the like. This is not specifically limited in the embodiments of this disclosure.

It should further be understood that, in the embodiments of this disclosure, a terminal device may communicate with one or more core networks (Core Network) by using a radio access network (Radio Access Network, RAN), and the terminal device may be referred to as an access terminal, user equipment (UE), a subscriber unit, a subscriber station, a mobile station, a mobile console, a remote station, a remote terminal, a mobile device, a user terminal, a terminal, a wireless communications device, a user agent or a user apparatus. The UE may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, a vehicle-mounted device, a wearable device, a terminal device in a future 5G network, or the like.

Considering that a network device cannot directly obtain information about a terminal device in a neighboring cell, to achieve this objective, interference measurement should be performed between terminal devices in coverage of different cells, to learn of an interference relationship between the terminal devices, and then a measurement result is reported to the network device.

According to a method for sending information, a method for receiving information, a network device, and a terminal device in the embodiments of this application, a terminal device in coverage of a network device can obtain an interference relationship with a terminal device in a neighboring cell.

Figure 3:
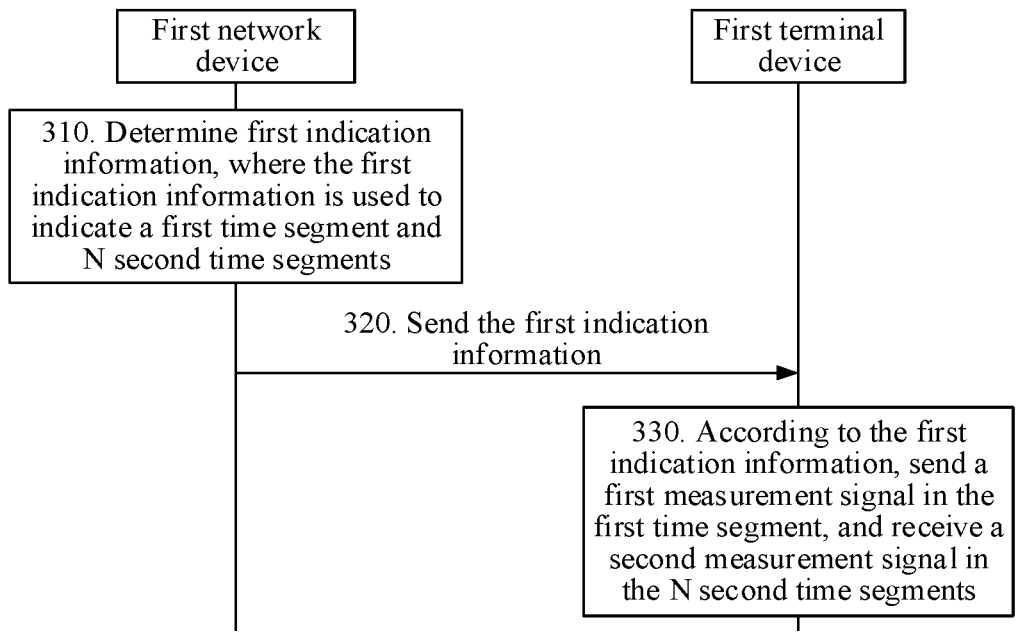
FIG. 3 is a schematic diagram of a method for transmitting data according to an embodiment of the present disclosure.

FIG. 3 is a schematic flowchart of a method 300 for transmitting data according to an embodiment of this disclosure.

As shown in FIG. 3, the method 300 includes the following blocks.

Block 310. Determine first indication information, where the first indication information is used to indicate a first time segment and N second time segments.

Specifically, a first network device determines the first indication information. The first indication information is used to indicate the first time segment and the N second time segments. The first time segment is used by a first terminal device to send a first measurement signal to at least one second terminal device in coverage of N second network devices, and a $k^{th}$ second time segment of the N second time segments is used by the first terminal device to receive a second measurement signal from a second terminal device in the coverage of a $k^{th}$ second network device of the N second network devices, where N is a positive integer, and k=1, 2, ..., and N.

It should be understood that, in this embodiment of this disclosure, terms such as first, second, and third may be used to describe various network devices, measurement signals, and indication information, but these network devices, measurement signals, and indication information should not be limited to these terms. These terms are used to distinguish the network devices, measurement signals, and indication information from each other.

For example, when N is 1, the technical solution in this embodiment of this disclosure may alternatively be: The first network device sends the first indication information to the first terminal device, where the first indication information indicates the first time segment and one second time segment, the first time segment is used by the first terminal device to send the first measurement signal to the second terminal device, and the second time segment is used by the first terminal device to receive the second measurement signal from the second terminal device. The second terminal device belongs to the coverage of the second network device, and the first network device and the second network device are different network devices.

For another example, when N is 2, the technical solution in this embodiment of this disclosure may alternatively be: The first network device sends the first indication information to the first terminal device, where the first indication information indicates the first time segment and two second time segments, the first time segment is used by the first terminal device to send the first measurement signals to the second terminal device and a third terminal device, one of the two time segments is used by the first terminal device to receive the second measurement signal from the second terminal device, and the other one of the two second time segments is used by the first terminal device to receive a third measurement signal from a third terminal device. The second terminal device belongs to the coverage of the second network device, the third terminal device belongs to the coverage of the third network device, and the first network device, the second network device, and the third network device are different network devices.

In this embodiment of this disclosure, by using the first indication information, the first network device specifically indicates a time domain resource used by the first terminal device to send the first measurement signal and a time domain resource used by the first terminal device to receive the second measurement signal, so that the first terminal device can obtain an interference relationship with the terminal device in the neighboring cell.

It should be noted that mutual coordination is performed between the first network device and the N second network devices, so that the second network device learns of a time resource for sending a measurement signal by the first network device and a time resource for receiving a measurement signal by the first network device. A possible method is: A centralized controller of a network notifies the first network device and the second network device of a time domain resource used by the other device for measurement. Another possible method is: The first network device and the second network device learn, by exchanging information, of a time resource for sending a measurement signal by the other device and a time resource for receiving a measurement signal by the other device.

In addition, the first network device once indicates the time domain resource for sending the first measurement signal by the first terminal device and the time domain resource for receiving the second measurement signal by the first terminal device, so that the first network device is prevented from sending a plurality of pieces of indication information to the first terminal device, thereby further saving signaling overheads.

For example, the first network device may further send one piece of indication information to the first terminal device in coverage of the first network device, to indicate that the first terminal device sends the first measurement signal to a terminal device in coverage of another network device, and also indicate a resource used for sending the first measurement signal. In addition, the first network device may further send another piece of indication information to the first terminal device, to indicate that the first terminal device receives a second measurement signal from the terminal device in the coverage of the another network device, and also indicate a resource used for receiving the second measurement signal.

However, compared with this embodiment of this disclosure, in the technical solution, the first network device should send the indication information twice to the first terminal device, increasing signaling overheads.

It should be noted that, in this embodiment of this disclosure, the first network device may determine the first indication information through negotiation with another network device. However, this embodiment of this disclosure is not limited thereto.

Optionally, the first time segment and some or all of the N second time segments belong to a first time unit, where the first time unit is any one of the following:

a slot, a subframe, a mini-slot, a plurality of consecutive slots, and a plurality of consecutive subframes.

Specifically, the first time segment and some or all of the N second time segments may belong to a same slot or a same subframe, or belong to a plurality of consecutive subframes. In this way, measurement between the terminal devices can be quickly completed. This helps the network devices use coordinated scheduling in a timely manner, to avoid cross link interference.

In other words, time of the first time unit is relatively short, so that the first terminal device quickly completes the measurement between the terminal devices, and reports a measurement result to the first network device in a timely manner. This helps the first network device use coordinated scheduling in a timely manner to avoid cross link interference, and also can avoid a measurement result delay caused by relatively long measurement time, thereby improving measurement accuracy.

Figure 4:
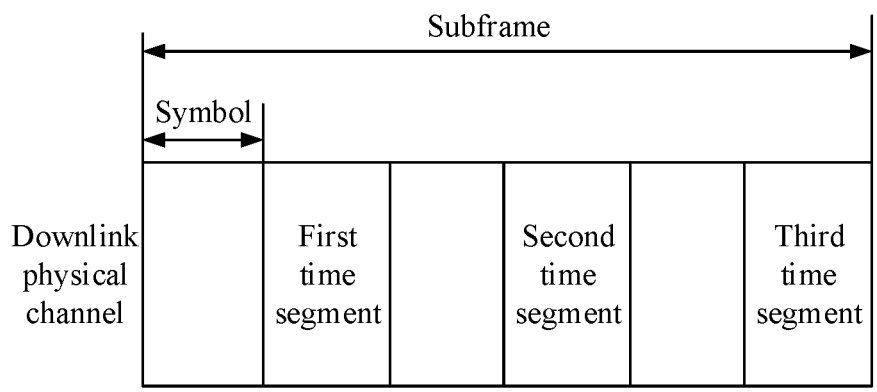
FIG. 4 is a schematic diagram of a time segment according to an embodiment of the present disclosure.

For example, as shown in FIG. 4, when N is 2, the first time segment, the second time segment, and a third time segment may belong to a same subframe.

Optionally, the first time segment includes at least one symbol or at least one mini-slot, and the $k^{th}$ second time segment includes at least one symbol or at least one mini-slot.

For example, as shown in FIG. 4, the first time segment includes one symbol, and/or the $k^{th}$ second time segment includes one symbol, to save resource overheads used for measurement between the terminal devices.

320. Send the first indication information.

Specifically, the first network device sends the first indication information to the first terminal device in the coverage of the first network device.

Optionally, the first indication information is cell-common information, and/or the first indication information is carried in downlink control information.

For example, the first indication information is cell-common information. That is, the first terminal device in the coverage of the first network device receives same indication information. This helps save overheads caused by sending of the indication information by the network device.

For another example, as shown in FIG. 4, the first indication information is carried in downlink control information, and the downlink control information carrying the first indication information is transmitted on a downlink physical control channel in a subframe, that is, the first terminal device receives the first indication information on the downlink physical control channel.

For another example, the first indication information may alternatively be carried in cell-common downlink control information.

That is, in this embodiment of this disclosure, the first network device adds the first indication information to the cell-common downlink control information, and sends the first indication information to the first terminal device. The first indication information indicates a resource for measurement by the first terminal device.

In addition, in this embodiment of this disclosure, configuration is faster performed by using downlink control information than by using other higher layer signaling, thereby improving flexibility of information notification. Control information overheads can be saved by using the cell-common downlink control information.

Optionally, if the first indication information is carried in the downlink control information, the first network device should determine second indication information before determining the first indication information. The second indication information is used to indicate that the first terminal device receives the first indication information. The first network device sends the second indication information to the first terminal device.

Optionally, the second indication information further indicates that the first terminal device receives auxiliary information of the first indication information, including at least one of the following: a frame number, a subframe number, and a slot number that are of the first indication information.

330. According to the first indication information, send a first measurement signal in the first time segment, and receive a second measurement signal in the N second time segments.

Specifically, the first terminal device sends, in the first time segment according to the first indication information, the first measurement signal to the second terminal device in the coverage of the N second network devices. The first terminal device receives, in the $N^{th}$ second time segment according to the first indication information, the second measurement signal sent by the second terminal device in the coverage of each of the N second network devices.

For example, when N is 1, the first terminal device receives the first indication information from the first network device. The first indication information indicates the first time segment and the second time segment. The first time segment is used by the first terminal device to send the first measurement signal to the second terminal device, and the second time segment is used by the first terminal device to receive the second measurement signal from the second terminal device. The second terminal device belongs to the coverage of the second network device, and the first network device and the second network device are different network devices.

For another example, when N is 2, the first terminal device receives the first indication information from the first network device. The first indication information indicates the first time segment and two second time segments. The first time segment is used by the first terminal device to send the first measurement signals to the second terminal device and the third terminal device, one of the two time segments is used by the first terminal device to receive the second measurement signal from the second terminal device, and the other one of the two second time segments is used by the first terminal to receive the third measurement signal from the third terminal device. The second terminal device belongs to the coverage of the second network device, the third terminal device belongs to the coverage of the third network device, and the first network device, the second network device, and the third network device are different network devices.

It should be noted that, in this embodiment of this disclosure, the first terminal device may generate a measurement result based on the second measurement signal, where the measurement result includes an interference relationship between the first terminal device and the second terminal device in the coverage of each of the N second network devices; and the first terminal device sends the measurement result to the first network device.

That is, a network device in this embodiment of this disclosure sends indication information to a terminal device in the coverage of the network device, to indicate a resource used by the terminal device to measure a signal, so that terminal devices in coverage of different network devices can effectively perform measurement and report measurement results to the network devices, and the network devices can obtain an interference relationship between the terminal devices, to perform coordinated scheduling based on the interference relationship.

Figure 5:
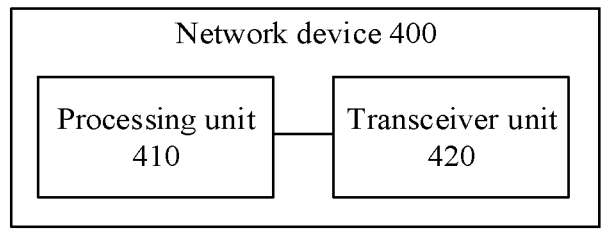
FIG. 5 is a schematic block diagram of a network device according to an embodiment of the present disclosure.

FIG. 5 is a schematic block diagram of a network device 400 according to an embodiment of this disclosure.

As shown in FIG. 5, the network device 400 includes:

a processing unit 410, configured to determine first indication information, where the first indication information is used to indicate a first time segment and N second time segments, the first time segment is used by a first terminal device to send a first measurement signal to at least one second terminal device in coverage of N second network devices, and a $k^{th}$ second time segment of the N second time segments is used by the first terminal device to receive a second measurement signal from a second terminal device in the coverage of a $k^{th}$ second network device of the N second network devices, where N is a positive integer, and k=1, 2, ..., and N; and a transceiver unit 420, configured to send the first indication information to the first terminal device.

Optionally, the first time segment and some or all of the N second time segments belong to a first time unit, where the first time unit is any one of the following:

a slot, a subframe, a mini-slot, a plurality of consecutive slots, and a plurality of consecutive subframes.

Optionally, the first time segment includes at least one symbol or at least one mini-slot, and the $k^{th}$ second time segment includes at least one symbol or at least one mini-slot.

Optionally, the first indication information is cell-common information, and/or the first indication information is carried in downlink control information.

Optionally, if the first indication information is carried in the downlink control information, the processing unit 410 is further configured to determine second indication information before determining the first indication information. The second indication information is used to indicate that the first terminal device receives the first indication information. The first network device sends the second indication information to the first terminal device.

It should be noted that, in this embodiment of this disclosure, the processing unit 410 may be implemented by a processor, and the transceiver unit 420 may be implemented by a transceiver.

Figure 6:
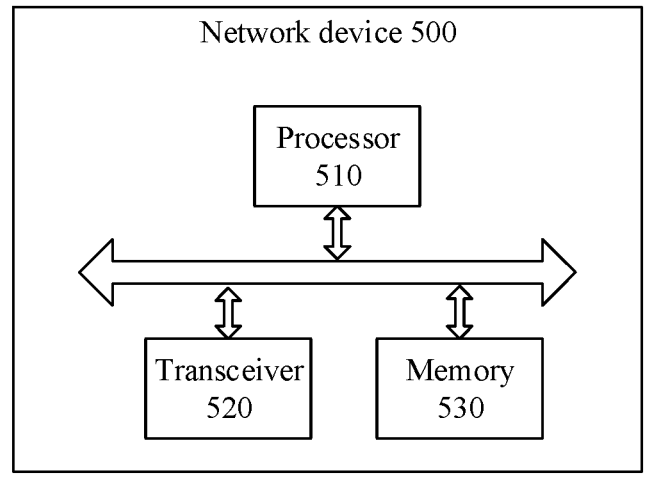
FIG. 6 is another schematic block diagram of a network device according to an embodiment of the present disclosure.

As shown in FIG. 6, a network device 500 may include a processor 510, a transceiver 520, and a memory 530. The memory 530 may be configured to store signaling, and may be further configured to store code, an instruction, and the like that are executed by the processor 510.

As an example rather than a limitation, a communication connection is implemented between the processor 510, the transceiver 520, and the memory 530 in a manner such as by using a bus.

It should be noted that a method performed by the processor is consistent with the content in the foregoing method embodiment. Details are not described again.

Figure 7:
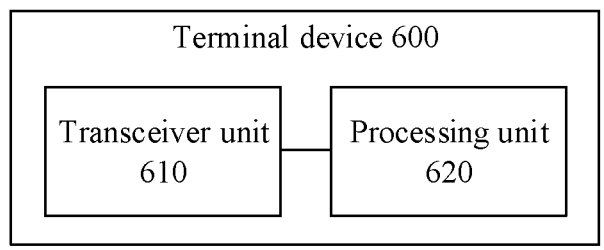
FIG. 7 is a schematic block diagram of a terminal device according to an embodiment of the present disclosure.

FIG. 7 is a schematic block diagram of a terminal device 600 according to an embodiment of this disclosure.

As shown in FIG. 7, the terminal device includes a transceiver unit 610 and a processing unit 620, where the transceiver unit 610 is configured to:

receive first indication information sent by a first network device, where the first indication information is used to indicate a first time segment and N second time segments, the first time segment is used to send a first measurement signal to at least one second terminal device in coverage of N second network devices, and a $k^{th}$ second time segment of the N second time segments is used to receive a second measurement signal from a second terminal device in the coverage of a $k^{th}$ second network device in the N second network devices, where N is a positive integer, and k=1, 2, . . . , and N; and the processing unit 620 is configured to: send, in the first time segment according to the first indication information, the first measurement signal to the second terminal devices in the coverage of the N second network devices, and receive, in the $N^{th}$ second time segment according to the first indication information, the second measurement signal from the second terminal device in the coverage of each of the N second network devices.

Optionally, the first time segment and some or all of the N second time segments belong to a first time unit, where the first time unit is any one of the following:

a slot, a subframe, a mini-slot, a plurality of consecutive slots, and a plurality of consecutive subframes.

Optionally, the first time segment includes at least one symbol or at least one mini-slot, and the $k^{th}$ second time segment includes at least one symbol or at least one mini-slot.

Optionally, the first indication information is cell-common information, and/or the first indication information is carried in downlink control information.

Optionally, if the first indication information is carried in the downlink control information, the transceiver unit 610 is further configured to: before the first indication information is generated, receive second indication information sent by the first network device. The second indication information is used to indicate that the first terminal device receives the first indication information.

Optionally, the processing unit 620 is further configured to generate a measurement result based on the second measurement signal. The measurement result includes an interference relationship between the first terminal device and the second terminal device in the coverage of each of the N second network devices. The transceiver unit 610 is further configured to send the measurement result to the first network device.

It should be noted that, in this embodiment of this disclosure, the transceiver unit 610 may be implemented by a transceiver, and the processing unit 620 may be implemented by a processor.

Figure 8:
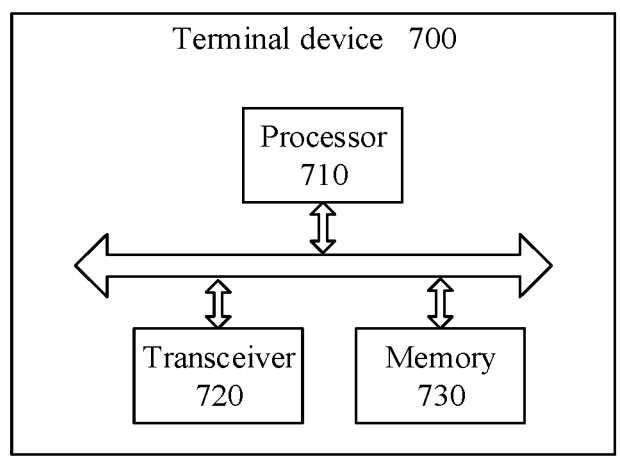
FIG. 8 is another schematic block diagram of a terminal device according to an embodiment of the present disclosure.

As shown in FIG. 8, a terminal device 700 may include a processor 710, a transceiver 720, and a memory 730. The memory 730 may be configured to store signaling, and may be further configured to store code, an instruction, and the like that are executed by the processor 710.

As an example rather than a limitation, a communication connection is implemented between the processor 710, the transceiver 720, and the memory 730 in a manner such as by using a bus.

It should be noted that a method performed by the processor is consistent with the content in the foregoing method embodiment. Details are not described again.

In addition, the processing units in the foregoing network device and terminal device each may include a plurality of processing units. Similarly, the processor may include a plurality of processors.

It should be noted that the foregoing method embodiment may be applied to a processor or may be implemented by a processor. The processor may be an integrated circuit chip and has a signal processing capability. In an example process, actions, operations, tasks, functions, etc., in the foregoing method embodiment may be completed by using an integrated logic circuit of hardware in the processor or by using an instruction in a form of software. The foregoing processor may be a general purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logic device, a transistor logic device, or a discrete hardware component. The processor may implement or perform the methods, the actions, operations, functions, tasks, etc., and logical block diagrams that are disclosed in the embodiments of this disclosure. The general purpose processor may be a microprocessor, or the processor may be any conventional processor or the like. Actions, operations, functions, tasks, etc., of the methods disclosed with reference to the embodiments of this disclosure may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in a memory, and the processor reads information from the memory and completes the actions, operations, functions, tasks, etc., in the foregoing methods in combination with hardware of the processor.

It may be understood that, in the embodiments of this disclosure, the memory may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. Through example but not limitative description, RAMs in many forms are available, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchronous link DRAM, SLDRAM), and a direct rambus random access memory (Direct Rambus RAM, DR RAM). It should be noted that the memory in the system and the method that are described in this specification is intended to include but is not limited to these memories and any other proper type of memory. The foregoing storage medium includes any medium that can store program code, such as a USB flash drive, a removable hard disk, a magnetic disk, or an optical disc.

It should be understood that the terms used in the embodiments of this disclosure and appended claims are merely used for describing specific embodiments, and are not intended to limit the embodiments of this disclosure.

For example, the term "and/or" in the embodiments of this disclosure is merely an association relationship for describing associated objects and represents that three relationships may exist. Specifically, A and/or B may represent the following three cases: Only A exists, both A and B exist, and only B exists. In addition, the character "/" in this specification usually indicates an "or" relationship between the associated objects.

For another example, the terms "a", "the" and "the" of singular forms used in the embodiments of this disclosure and appended claims are also intended to include plural forms, unless otherwise specified in the context clearly.

For another example, depending on the context, for example, the word "if" used herein may be explained as "while" or "when" or "in response to determining" or "in response to detection". Similarly, depending on the context, phrases "if determining" or "if detecting (a stated condition or event)" may be explained as "when determining" or "in response to determining" or "when detecting (the stated condition or event)" or "in response to detecting (the stated condition or event)".

A person of ordinary skill in the art may be aware that, in combination with the examples described in the embodiments disclosed in this specification, units and algorithms may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of this disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between apparatuses or units may be implemented in electronic, mechanical, or other forms.

The foregoing units described as separate parts may or may not be physically separate, and parts displayed as units may or may not be physical units, may be located in one position, or may be distributed on a plurality of network units. Some or all of the units may be selected based on actual requirements to achieve the objectives of the embodiments of this disclosure.

In addition, functional units in the embodiments of this disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the embodiments of this disclosure essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the actions, operations, functions, tasks, etc., of the methods described in the embodiments of this disclosure.

The foregoing descriptions are merely specific examples of the embodiments of this disclosure, but are not intended to limit the protection scope of the embodiments of this disclosure. Any variation or replacement readily figured out by a person skilled in the art within the technical scope disclosed in the embodiments of this disclosure shall fall within the protection scope of the embodiments of this disclosure. Therefore, the protection scope of the embodiments of this disclosure should be subject to the protection scope of the claims.

What is claimed is:

1. A method for sending information, comprising:
determining, by a first network device, first indication information, wherein the first indication information indicates a first time segment and N second time segments, the first time segment is used by a first terminal device to send a first measurement signal to at least one second terminal device in coverage of N second network devices, and a $k^{th}$ second time segment of the N second time segments is used by the first terminal device to receive a second measurement signal from a second terminal device in the coverage of a $k^{th}$ second network device of the N second network devices, wherein N is a positive integer, and k is a positive integer from 1 to N; and
sending, by the first network device, the first indication information to the first terminal device.

2. The method of claim 1, wherein the first time segment and one or more of the N second time segments belong to a first time unit, and the first time unit comprises one or more of:
a slot, a subframe, a mini-slot, a plurality of consecutive slots, and a plurality of consecutive subframes.

3. The method of claim 1, wherein the first time segment comprises at least one symbol or at least one mini-slot, and the $k^{th}$ second time segment comprises at least one symbol or at least one mini-slot.

4. The method of claim 1, wherein one or more of: the first indication information comprises cell-common information or the first indication information is carried in downlink control information.

5. The method of claim 1, wherein the determining, by a first network device, the first indication information comprises:
   determining, by the first network device, the first indication information through negotiation with the N second network devices.

6. A method for sending and receiving information, comprising:
   receiving, by a first terminal device, first indication information from a first network device, wherein the first indication information indicates a first time segment and N second time segments, the first time segment is used by the first terminal device to send a first measurement signal to at least one second terminal device in coverage of N second network devices, and a $k^{th}$ second time segment of the N second time segments is used by the first terminal device to receive a second measurement signal from a second terminal device in the coverage of a $k^{th}$ second network device of the N second network devices, wherein N is a positive integer, and k is a positive integer from 1 to N;
   sending, by the first terminal device based on the first indication information, the first measurement signal to the second terminal device in the coverage of the N second network devices in the first time segment; and
   receiving, by the first terminal device based on the first indication information, the second measurement signal from the second terminal device in the coverage of each of the N second network devices in the N second time segments.

7. The method of claim 6, wherein the first time segment and one or more of the N second time segments belong to a first time unit, and the first time unit comprises one or more of:
   a slot, a subframe, a mini-slot, a plurality of consecutive slots, and a plurality of consecutive subframes.

8. The method of claim 6, wherein the first time segment comprises at least one symbol or at least one mini-slot, and the $k^{th}$ second time segment comprises at least one symbol or at least one mini-slot.

9. The method of claim 6, wherein one or more of the first indication information comprises cell-common information or the first indication information is carried in downlink control information.

10. A network device, comprising:
   a processing unit, configured to determine first indication information, wherein the first indication information indicates a first time segment and N second time segments, the first time segment is used by a first terminal device to send a first measurement signal to at least one second terminal device in coverage of N second network devices, and a $k^{th}$ second time segment of the N second time segments is used by the first terminal device to receive a second measurement signal from a second terminal device in the coverage of a $k^{th}$ second network device of the N second network devices, wherein N is a positive integer, and k is a positive integer from 1 to N; and
   a transceiver unit, configured to send the first indication information to the first terminal device.

11. The network device of claim 10, wherein the first time segment and one or more of the N second time segments belong to a first time unit, and the first time unit comprises one or more of:
   a slot, a subframe, a mini-slot, a plurality of consecutive slots, and a plurality of consecutive subframes.

12. The network device of claim 10, wherein the first time segment comprises at least one symbol or at least one mini-slot, and the $k^{th}$ second time segment comprises at least one symbol or at least one mini-slot.

13. The network device of claim 10, wherein one or more of the first indication information comprises cell-common information or the first indication information is carried in downlink control information.

14. A terminal device, comprising a transceiver unit and a processing unit, wherein
   the transceiver unit is configured to:
   receive first indication information from a first network device, wherein the first indication information indicates a first time segment and N second time segments, the first time segment is used to send a first measurement signal to at least one second terminal device in coverage of N second network devices, and a $k^{th}$ second time segment of the N second time segments is used to receive a second measurement signal from a second terminal device in the coverage of a $k^{th}$ second network device of the N second network devices, wherein N is a positive integer, and k is a positive integer from 1 to N;
   the processing unit is configured to send, based on the first indication information, the first measurement signal to the second terminal device in the coverage of the N second network devices by using the transceiver unit in the first time segment; and
   the processing unit is configured to receive, based on the first indication information, the second measurement signal from the second terminal device in the coverage of each of the N second network devices by using the transceiver unit in the $N^{th}$ second time segment.

15. The terminal device of claim 14, wherein the first time segment and one or more of the N second time segments belong to a first time unit, and the first time unit comprises one or more of:
   a slot, a subframe, a mini-slot, a plurality of consecutive slots, and a plurality of consecutive subframes.

16. The terminal device of claim 14, wherein the first time segment comprises at least one symbol or at least one mini-slot, and the $k^{th}$ second time segment comprises at least one symbol or at least one mini-slot.

17. The terminal device of claim 14, wherein the first indication information comprises cell-common information, and/or the first indication information is carried in downlink control information.

* * * * *